United States Patent [19]

Söding et al.

[11] 4,105,316
[45] Aug. 8, 1978

[54] FILM STRIP PROJECTION APPARATUS

[75] Inventors: Bernward Söding, Munich; Reinhard Freisleben, Pöring Post Zorneding, both of Fed. Rep. of Germany

[73] Assignee: Soding TV GmbH & Co. Bild & Ton International, Lochham bei Munich, Fed. Rep. of Germany

[21] Appl. No.: 792,797

[22] Filed: May 2, 1977

[30] Foreign Application Priority Data

| May 10, 1976 | [DE] | Fed. Rep. of Germany | 2620573 |
| May 10, 1976 | [DE] | Fed. Rep. of Germany | 2620564 |
| May 10, 1976 | [DE] | Fed. Rep. of Germany | 7614728 |
| Aug. 30, 1976 | [DE] | Fed. Rep. of Germany | 7627084 |
| Aug. 30, 1976 | [DE] | Fed. Rep. of Germany | 7627085 |

[51] Int. Cl.² ............................................. G03B 23/08
[52] U.S. Cl. .................................................. 353/109
[58] Field of Search ................. 353/109, DIG. 2, 42, 353/108, 26 R, 26 A; 352/126, 233, 241; 226/75, 82, 86; 40/32, 43, 96, 86 A

[56] References Cited

U.S. PATENT DOCUMENTS

| 3,113,823 | 12/1963 | Phillips | 226/75 X |
| 3,301,128 | 1/1967 | Brandt et al. | 353/109 |

FOREIGN PATENT DOCUMENTS

162,279  4/1921  United Kingdom ..................... 352/233

*Primary Examiner*—Harry N. Haroian
*Attorney, Agent, or Firm*—Lerner, David, Littenberg & Samuel

[57] ABSTRACT

A projector for continuously screening a strip of transparency film having perforated margins includes means for feeding said strip in a closed path defined by said feeding means. The feeding means comprise two endless conveyor belts which are spaced apart so as to support said perforated strip margins and which are each provided with at least one lug releasably engageable in a respective perforated margin with a snap fit for anchoring the two ends of the strip to the belts and forming a loop of film.

20 Claims, 16 Drawing Figures

FILM STRIP PROJECTION APPARATUS

The invention relates to a film strip projection apparatus for the continuous screening of film strips, particularly transparency film strips, which can be led past a gate of an optical projection system by conveying means engaging in the film perforations.

Hitherto conventional projectors of this kind use a film strip that is stuck to form a closed loop and that is wound in the form of a spool, the end that is located on the inside of the spool being connected to the end located on the outside of the spool. The film spool thus formed is held with the aid of a yoke or loosely locally so that it is free to rotate when the film material is withdrawn from the inside and led back to the outside of the spool. Apart from the fact that the film strip has to be stuck together at the ends, this system has the disadvantage that not only the insertion but also generally the replacement of film strips is extraordinarily cumbersome. Apart from this, the film is always wound back on itself so that the individual film layers of the wound spool rub on one another and the film becomes damaged.

It has already been suggested to guide the film strip in a closed substantially annular path of which the length is equal to or slightly less than the length of the film strip. This safeguards the film and the ends of the film do not have to be stuck together so that handling is simplified.

An essential component of this construction is the annular path. For the purpose of this construction it has likewise already been suggested to make it in the form of a closed annular guide channel in which one longitudinal edge of the film strip is insertable and which is faced by a guide surface. Although one thus obtains a very simple positive guide along which the film can be slid, the introduction as well as the removal cannot be carried out without problems.

It is therefore the object of the invention to provide a film strip projection apparatus of the last-mentioned kind which permits reliable insertion and removal of a film strip and secure positive guiding.

This object is fulfilled in that the path is formed by two endless conveyor belts that circulate in alignment at a spacing from each other equal to that of the two perforated margins of the film strip and are each provided at the same position with at least one lug which engages a respective one of the perforated margins of the film strip and over which the start and end of the film strip can be placed with a snap fit. In this case the film strip is first of all placed on the lugs with one end, whereafter the conveyor belts, of which the length corresponds to the length of the film strip, are advanced by the length of the film strip, the film strip being continuously pulled along by the lugs engaged in the leading end of the film. After one circulation, the trailing end of the film can then be placed over the leading end. To insert the strip of film it is therefore only necessary to ensure that the conveyor belts are accessible so that the lugs can be conveniently reached.

It is of particular advantage in this respect if the lug is in the form of a round screw with a slotted head which overlaps the longitudinal edges of the perforations and is arched or conical, the area between adjacent perforations being stamped out at the position where the lug engages. This construction permits a certain amount of length compensation during operation, this possibly being necessary as a result of temperature fluctuations.

To enable feeding without slip, the conveyor belts are preferably serrated and associated with complementary direction-changing wheels. For the purpose of securely retaining the position, the direction-changing wheels are provided with laterally closed tooth flanks and each wheel has on one side an annular flange that projects beyond the film strip so that the height of the conveyor belt is maintained and slipping of the film strip is avoided.

Advantageous means for tensioning the conveyor belts are obtained in that the gate of the optical projection system is formed by a guide frame which is transversely offset into the paths of the conveyor belts and the film to tension the belts and guide the film in a fixed flat plane. The guide frame preferably also guides the conveyor belts transversely to the film direction so that changes in the height of the image are reduced to a minimum. To enable the tension in the conveyor belts to be adjusted in a simple manner, it is advantageous to make the guide frame adjustable perpendicular to the film surface.

A particularly compact construction of projection apparatus is achieved in that the illuminating portion of the optical projection system comprising a light source and the associated optics is provided with a cover and is cooled, this at the same time simplifying handling of the film strip and protecting the film and the operator from burns when the illumination is switched on. Conventionally, illuminating portions or illuminating units of optical projection systems comprise a base surface with two upstanding spaced plates between which a concave mirror is disposed behind a light source and a condenser of subsequent further elements such as heat-protecting filters, collecting lenses or the like is disposed in front of same. To permit a compact construction of the projector, this illuminating portion must be cooled and screened from other parts of the projector to protect same, it being borne in mind that the light source itself should be protected from intensive temperature fluctuations. Advantageously, a cover is for this purpose placed on the plates to surround same on all sides at a spacing, an inlet aperture for cooling air being provided at one longitudinal side of the plates between the cover and the plates and two spaced air outlet apertures at the other longitudinal side of the plates, the plates having apertures between the subsequent elements. In this construction, chambers are disposed on the outsides of the plates that are interconnected at the edges of the plates and by way of the plate apertures so that the cooling air supplied to one chamber effectively cools the entire illuminating portion and at the same time the light source is protected by being covered by the plates. (Two-chamber cooling system.)

To simplify threading of a film strip, the direction-changing wheels are preferably provided with a ratchet drive and manually rotatable.

An advantageous form of the invention resides in that each of the conveyor belts is provided at the same positions with a plurality of lugs, because in this way it is possible to assemble a 'programme' composed of short film strips.

The invention will now be described in more detail by way of examples with reference to diagrammatic drawings.

Figure 1:
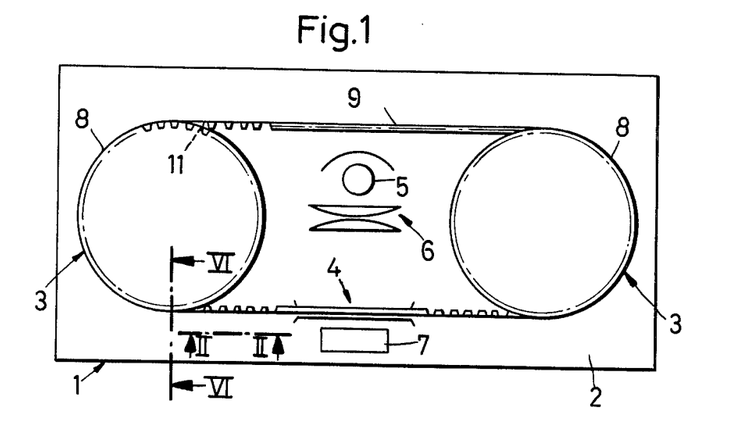
FIG. 1 is a diagrammatic plan view of a film strip projection apparatus according to the invention.

The illustrated film strip projection apparatus 1 comprises a base plate 2 on which a film conveyor 3 feeds a film strip past a gate 4 on one side of which there is a light source 5 with associated condenser 6 and on the other side of which there is a projection objective 7.

Figures 2, 4:
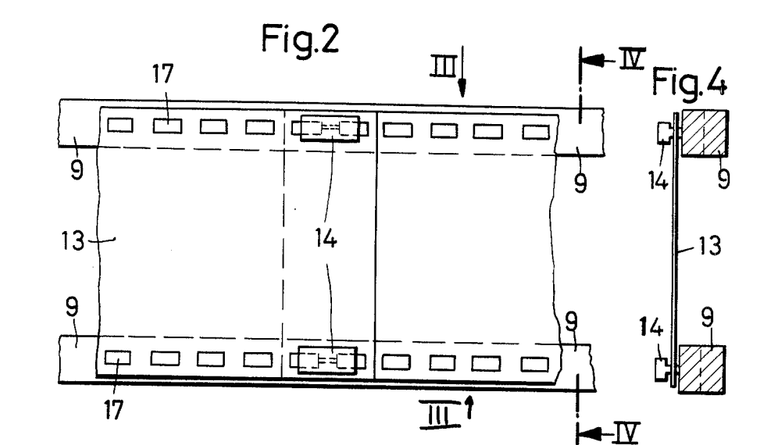
FIG. 2 is an elevation on the line II—II in FIG. 1.
FIG. 4 is a sectional view on the line IV—IV in FIG. 2.
Figure 3:
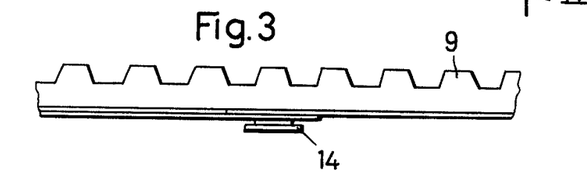
FIG. 3 is a plan view on the line III—III in FIG. 2.
Figure 5:
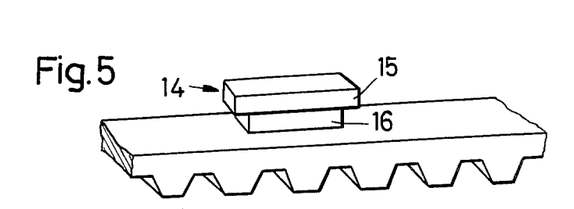
FIG. 5 is a fragmentary enlarged perspective view of a conveyor belt according to the invention provided with film-holding lugs.
Figure 6:
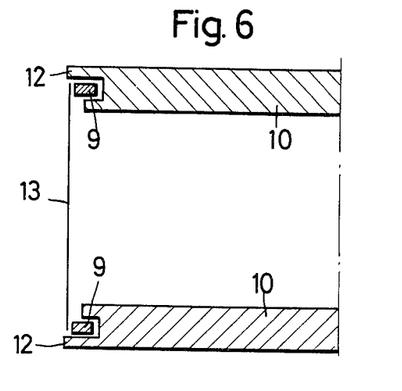
FIG. 6 is a sectional view on the line VI—VI in FIG. 1.

The conveyor 3 consists of two spaced pairs 8 of direction-changing wheels for two endless conveyor belts 9 which circulate in registry at a spacing equal to that of the perforated marginal strips of the film. The two conveyor belts are toothed belts as will be evident from FIG. 1 and particularly from FIG. 3. The direction-changing wheels 10 of the pairs 8 of wheels are associated with the toothed belts and provided with complementary teeth 11, between which the gaps are axially closed on both sides in order to locate the conveyor belts 9 axially with respect to the direction-changing wheels. The flat sides of the conveyor belts 9 opposite to their serrations project beyond the teeth of the direction-changing wheels and, according to FIG. 6, are overlapped at the top or bottom by an annular flange 12 which serves as a guide for the film strip 13 that is to be fed by means of the conveyor belts 9. For the feeding of this film strip 13, a lug 14 is provided on both conveyor belts 9 at the same position, as is most clearly evident from FIGS. 2 to 5. This lug 14 is substantially T-shaped in cross-section and corresponds to a short T-rail of which the head 15 also projects beyond the shank 16 in the axial direction. The lug 14 is somewhat longer than the perforations 17 of the perforated film strip margins. To enable a film strip 13 to be applied to these lugs, two adjoining perforations 17 are interconnected by an incision so that the film strip can be placed over the lugs in the manner of FIGS. 2 to 4. One end of the film strip 13 is first placed over the lugs 14. Thereafter, the pairs 8 of direction-changing wheels are rotated to correspond to one complete circulation of the conveyor belts 9 until the other end of the film can be placed over the lugs 14 at the same position. It will be obvious that the length of the film strip and that of the conveyor belts should be adapted to one another. For the purpose of applying a film strip 13, at least one position is preferably provided on the apparatus at which the conveyor belts with their lugs are conveniently accessible. By means of the special construction of the lugs 14, a secure seating for the film strip is ensured, the connection of the perforations co-operating with the lugs by means of an incision facilitating length compensation that will be particularly required when the tension in the conveyor belts is to be altered, which can be effected by displacing one of the pairs of direction-changing wheels with respect to the other.

The gate 4 consists of two guide plates 18 and 19 which are pressed together and which, at the level of the conveyor belts (see FIGS. 7 and 8) are provided with pasageways 20 and 21 for the conveyor belts 9 and lugs 14. Immediately adjoining these passageways on the inside, both guide plates are provided with a narrow guide ledge 22 for the film strips, these serving as the only supporting surfaces for the film. The two guide plates 18 and 19 may be of identical construction, a guide flange (not shown) preferably being provided on the outside of the passageways for projecting beyond the film strip. It is desirable to bevel the guide plates at the inlet and outlet ends according to FIG. 7.

Figure 9:
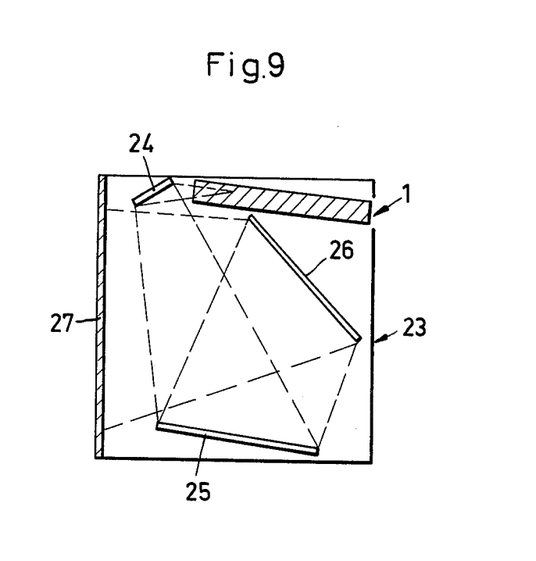
FIG. 9 shows the film strip projector of FIG. 1 as an insert unit in a display box.

The entire projection apparatus 1 can be made as a portable unit which, as in FIG. 9 is insertable in a display case 23 as is diagrammatically indicated in FIG. 9, this unit taking up such a position in the display case that one can conveniently obtain an extension of the projection path by means of several deflecting mirrors 24, 25 and 26 and thus an enlarged image area, the image being suitably projected onto a matt screen 27.

For the purpose of inserting a film strip 13, this unit 1 is preferably provided with access at one position by means of a window or the like. It will be desirable if the pairs 8 of direction-changing wheels are provided with a ratchet drive which is manually rotatable for insertion of the film. To press the guide plates 18 and 19 together, simple leaf springs 28 can be provided in accordance with FIG. 8 so that lifting off and possible replacement of the guide plates is also conveniently possible.

Figure 10:
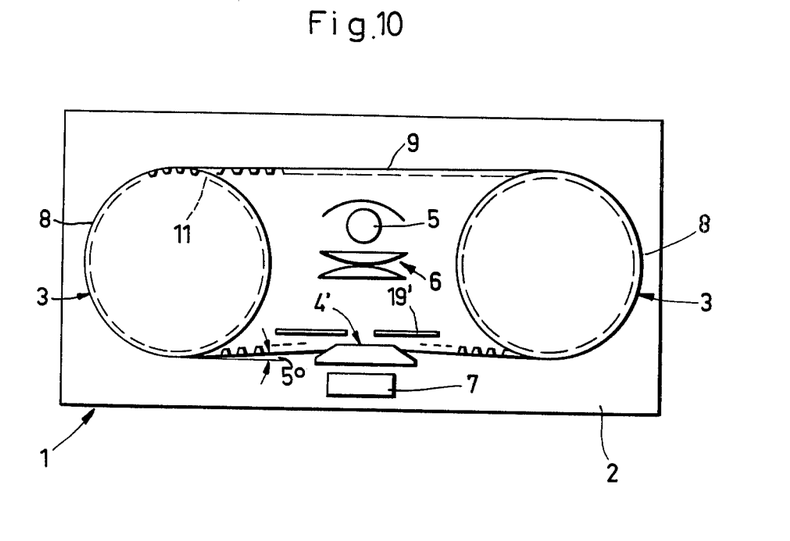
FIG. 10 is a view similar to FIG. 1 of a modified projection apparatus having a film gate without pressure plate.
Figure 11:
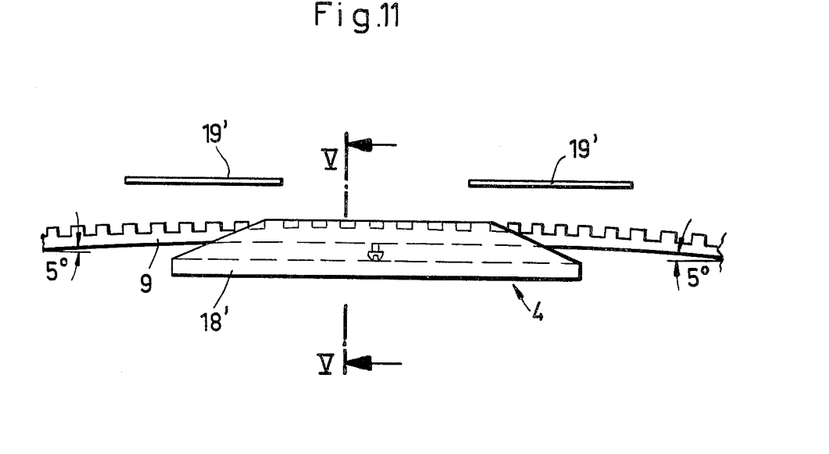
FIG. 11 is an enlarged plan view of the film gate of FIG. 10.

The embodiment according to FIG. 10 corresponds in essence to that of FIG. 1 except that a gate 4' is provided that has no pressure plates and with the aid of which the conveyor belts can be tensioned without displacing the pairs of direction-changing wheels, the guide plate 19 of FIG. 1 being replaced by a film mask 19' at a spacing from the gate. The gate 4' is formed by a guide frame 18' which is slightly transversely offset away from the objective 7 into the path of the conveyor belts 9 together with the film, so that the conveyor belts at both sides of the gate include an angle of about 5° with the plane of the gate or rather with the run-on and run-off tangent to the direction-changing wheels, this being sufficient to tension the conveyor belts having a tolerance in length of ±0.15mm. By reason of this transverse displacement, the conveyor belts are tensioned, the film being pressed against film guiding ledges 22' at the edge of the window in the guide frame 18' and being guided thereby along a defined surface. A guide transversely to the film can be achieved by guiding flanges 29 which engage and guide the conveyor belts 9 at the outer edge of the guide frame 18' beyond the film. Between the film guiding ledges 22' and the guiding flanges 29 there are passageways 21' for the lugs 14'. In this construction of the film gate, the film is guided only along one planar surface, whereby wear is minimised. In the same way as the guide plates in FIG.

Figure 7:
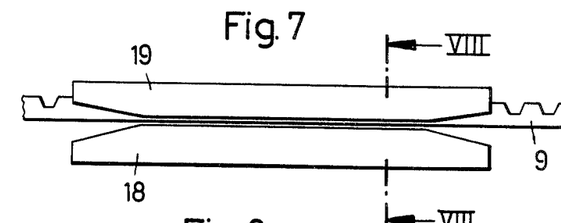
FIG. 7 is an enlarged plan view of the film gate and pressure plate of the projector according to FIG. 1.
Figure 8:
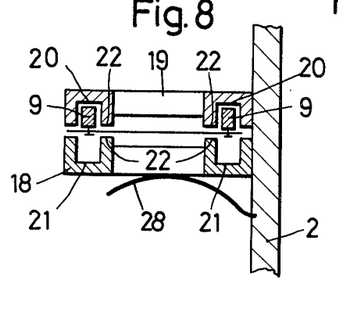
FIG. 8 is a section on the line VIII—VIII in FIG. 7.
Figure 12:
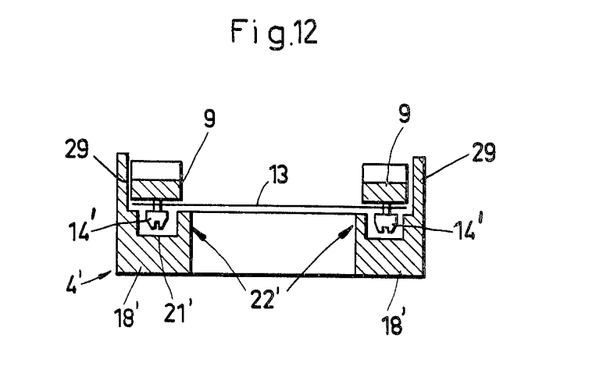
FIG. 12 is a side elevation on the line V—V in FIG. 11.
Figure 13:
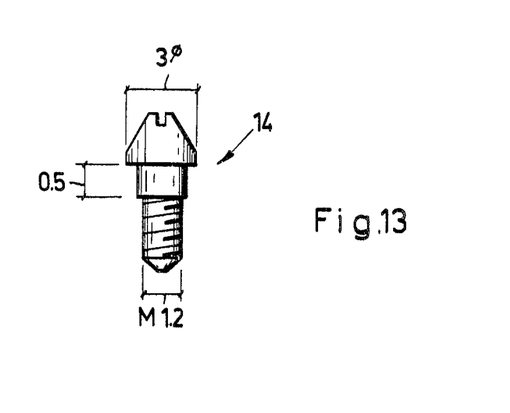
FIG. 13 is an elevation of a lug that is preferably used in conjunction with the film gate of FIG. 11.

7, the guiding faces of the guide frame 18' are preferably bevelled at the inlet and outlet ends so that the film and conveyor belts arrive and leave at an acute angle. With this film gate operating without pressure plates and serving for the simplified tensioning of the conveyor belts, lugs 14' are preferably used that are formed by a screw having a slotted conical or arched round head which overlaps the longitudinal edges of the perforations 17 according to FIG. 12, the area between adjoining perforations at the position where the lug 14' engages being stamped out. This makes it possible to compensate for length, the round form of the lug ensuring that the film strip is protected and the construction as a screw simplifying its application to the conveyor belts. The shank of the lug preferably has a diameter corresponding to the width of a perforation, e.g. 2 mm, and an unthreaded section disposed within the perforations with a length of twice the film thickness plus tolerance, i.e. for example 0.5 mm.

Figure 14:
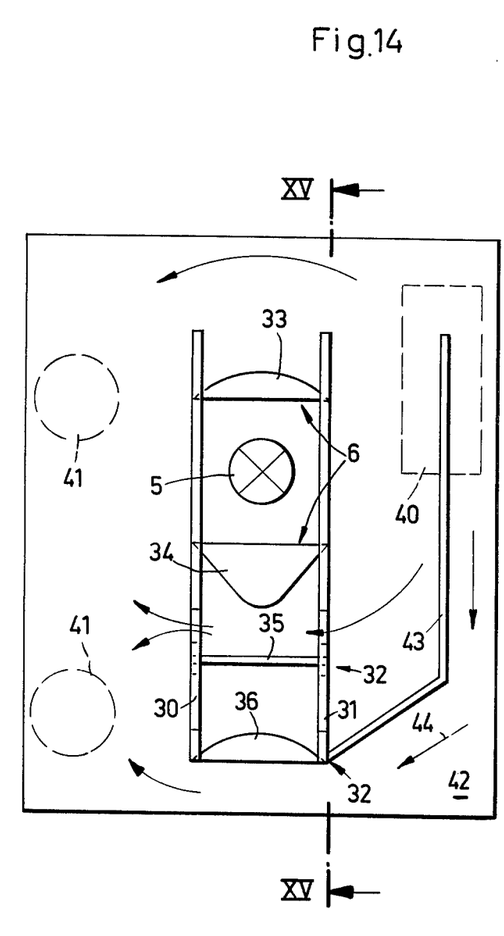
FIG. 14 is a plan view of an illuminating portion of the optical projection system in the apparatus of FIG. 1.
Figure 15:
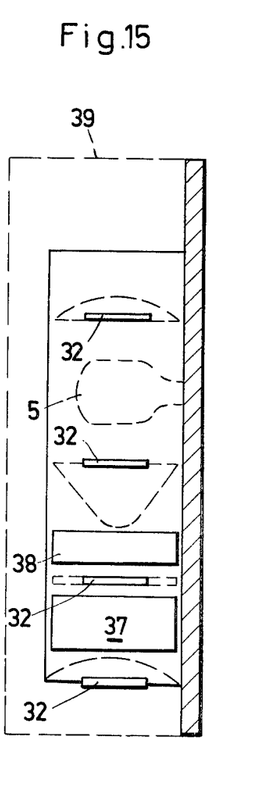
FIG. 15 is a side elevation on the line XV—XV in FIG. 14.

FIGS. 14 and 15 show an illuminating portion of the optical projection system comprising the light source 5 with the associated optic 6 and of very compact construction.

To parallel spaced plates 30 and 31 are secured to a base surface and serve as a holder for a series of optical elements, for which purpose they are provided with narrow retaining slots 32 in which the circular optical elements, for example a concave mirror 33, a parabolic lense 34, a heat protecting filter 35 and a collecting lense 36, are engaged with their edge at diametrally opposed sides. In the region between the parabolic lense 34 and the heat protecting filter 35 or between the latter and the collecting lense 36, the two plates 30 and 31 are provided with large apertures 37 and 38. The illuminating portion is screened by a cover 39 which overlaps the illuminating portion on all four sides on the base surface at a spacing therefrom, a fan 40 for cooling air being provided on one side and on the other side air outlet nipples 41 on the cover, the position of these nipples opposite to the illuminating portion being shown in broken lines in FIG. 12. The cooling air blown in by the fan 40 flows in the direction of the indicated arrows from one side of the illuminating portion around the outer ends thereof or through the apertures 37 and 38 to the other side and there leaves through the outlet nipples 41 so that all parts are effectively swept by air and at the same time the light source 5 is protected from temperature variations. It is of particular advantage if the chamber 42 associated to the air fan is sub-divided with the aid of a guide plate 43 with which part of the air stream is directed onto the front lense in accordance with the arrow 44 so that that is cooled and kept free from dust.

Figure 16:
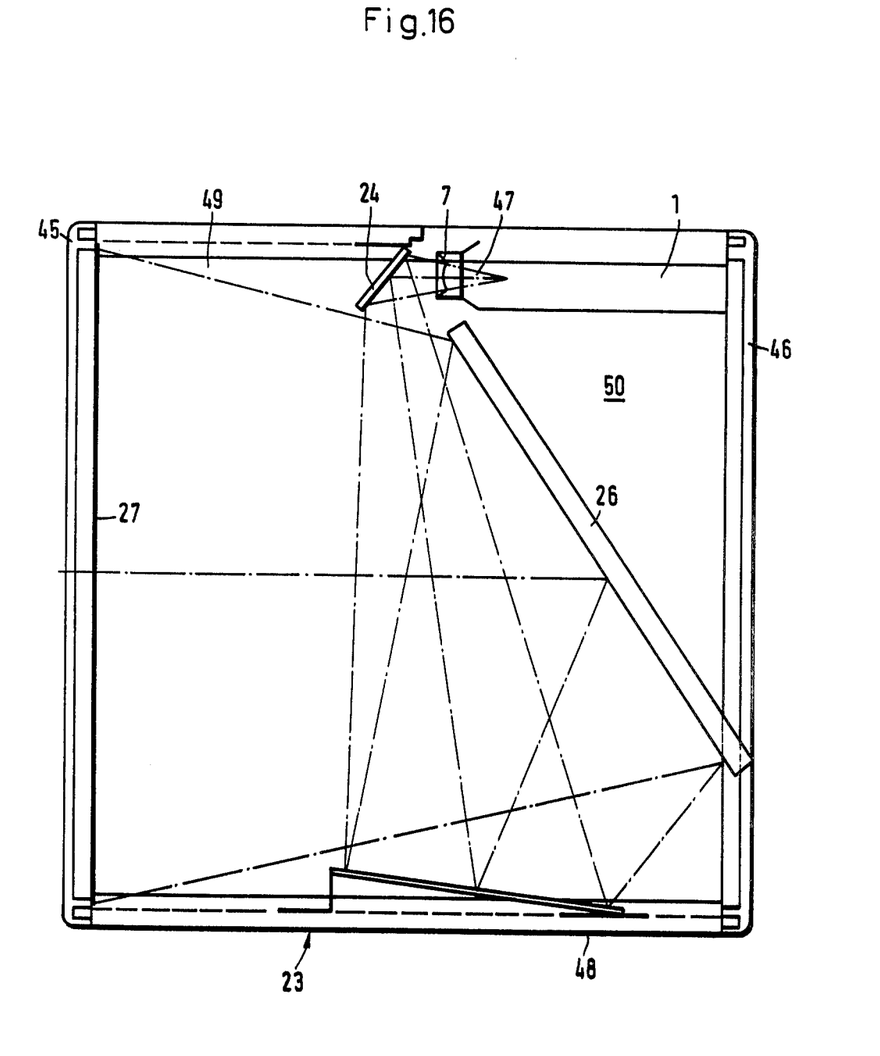
FIG. 16 is a view corresponding to FIG. 9.

FIG. 16 is a diagrammatic sectional representation corresponding to FIG. 9 and showing the display box 23 in its details in slightly modified form. The matt screen 27 is built into a front wall 45 of the display box 23 as screen. The projection device 1 is inserted at a rear wall 46 of the display box 23 at the right side edge thereof. A light bundle 47 emerging from the projection device 1 passes through the projection objective 7 and impinges upon the first deflecting mirror 24 mounted directly in front thereof, from whence it is reflected onto the second deflecting mirror 25 located at the wall 48 of the display box opposite said first reversing mirror. The second deflecting mirror 25 projects the light bundle onto the third deflecting mirror 26 which is disposed obliquely in the center of the interior space of the display box and projects the bundle of light beams 47 onto the matt screen 27. The projection objective 7 is so adjusted that the image formed on the matt screen 27 is sharply defined ever. The second deflecting mirror 25 and the third deflecting mirror 26 are disposed within the interior space of the display box such that the first deflecting mirror 24 can be conveniently accommodated in a dead corner 49 of the light bundle reflected from the third deflecting mirror, so that the matt screen 27 simultaneously is virtually the dimension for the front wall 45 of the display box. By the elected back setting of deflecting mirrors 25 and 26 as against the matt screen 27 and by the inclination of deflecting mirror 25, the first deflecting mirror 24 can be brought close to the projection objective 7 and the available space at the dead corner 49 can be elected large enough so as to render possible an optimal size of the deflecting mirror.

Thereby, the matt screen virtually occupies the whole front face of the disply box. By appropriately placing the second and third deflecting mirrors 25 and 26, the dead corner 49 is thereby so arranged that the first deflecting mirror 24 conveniently fits into an extremely favourable location. Thereby, the greatest possible projection area is provided for the same size of display box, with yet a sufficiently large space 50 behind the third deflecting mirror 26 for accommodating different servicing means for the overall film strip projection device.

We claim:

1. A film strip projector apparatus for the projection of a film strip, comprising:
    a closed substantially circular path formed in said projector apparatus about which said film strip is driven,
    an optical projection system disposed in said projector apparatus having a gate through which said film strip passes,
    said film strip being open-ended and flexible and including longitudinally extending edge portions each including perforations,
    said path including a pair of spaced apart and parallel conveyor belts mounted for circulation,
    the spacing of said conveyor belts being substantially equal to the spacing of said perforated edge portions, and
    said conveyor belts each including at least one lug for engaging said perforated edge portions to drive said openended film strip about said circular path.

2. Apparatus according to claim 1, wherein said lug is longer than the length of one perforation and the film strip includes a cut joining two perforations so that it can be placed over said lug.

3. Apparatus according to claim 1, characterised in that the lug (14') is a short T-rail of which both ends of the flange (15) project beyond the web (16).

4. Apparatus according to claim 1, characterised in that each lug (14') has the form of a round-headed screw which is screwed into the associated conveyor belt, of which the shank is set back from the head and has a thickness substantially equal to the width of one of the perforations in the film strip, and of which the head is arched or conical.

5. Apparatus according to claim 1, characterised in that the conveyor belts (9) are toothed belts.

6. Apparatus according to claim 1, characterised in that direction changing wheels (10) with laterally closed tooth gaps are provided for the conveyor belts (9), each direction-changing wheel being provided on one side with an annular flange (12) that projects beyond the film strip (13).

7. Apparatus according to claim 1, characterised in that at least one rectilinear section is provided for the conveyor belts (9), at which section there is disposed a film gate (4) formed by two guide plates (18, 19) which are pressed together and have passageways (20, 21) for the belts and lugs (14) at the level of the conveyor belts and, directly inwardly adjoining said passageways, a narror film guiding ledge (22) as the sole supporting face for the film.

8. Apparatus according to claim 7, characterised in that the guide plates (18, 19) have on the outside of the passageways (20, 21) a guide flange which overlaps the film strip.

9. Apparatus according to claim 7, characterised in that the guide plates (18, 19) are bevelled at the inlet and outlet ends.

10. Apparatus according to claim 1, wherein said gate is formed in a planar gate structure (4') by a guide frame (18') which is one-sidedly disposed on the outside of the film strip, is transversely offset into the paths of the conveyor belts (9) and the film to tension the belts (9), and is equipped at each of the upper and lower longitudinal edges with a film guiding ledge (22') for abutment of the film, the ledge comprising a passageway (21) for the lugs (14).

11. Apparatus according to claim 10, characterised in that the guide frame (18') has at each of the upper and lowerer edges a guide flange (29) that projects over or under the associated conveyor belt (9).

12. Apparatus according to claim 1, characterised in that the gate (4; 4') is adjustable perpendicular to the plane of the film strip.

13. Apparatus according to claim 10, characterised in that the transverse offsetting of the gate corresponds to an inlet or outlet angle of the conveyor belts to the stage of about 5°.

14. Apparatus according to claim 1, wherein direction-changing wheels (10) are provided with a ratchet drive and are manually rotatable, the path for the film being freely accessible from the outside at least at one location.

15. Apparatus according to claim 1 in which the optical projection system comprises a concave mirror behind a light source and a condenser in front of the source, all between two spaced plates upstanding from a base surface, characterised in that a cover (39) is place on the plates (30, 31) to surround same on all sides at a spacing, an air inlet aperture for a cooling fan (40) being provided at one longitudinal side of the plates between the cover (39) and the plates (30, 31) and two spaced air outlet apertures (41) on the other side, the plates having air apertures (37, 38) between the subsequent elements (34, 35, 36).

16. Apparatus according to claim 15, characterised in that part of the air stream on the side of the cooling fan is directed by a guide plate (43) to the front of the foremost lense (36) of the condenser.

17. Apparatus according to claim 1, characterised in that a plurality of lugs (14) is provided on each conveyor belt (9) at respectively the same location.

18. Apparatus according to claim 1, wherein said film strip projector apparatus is fixedly mounted in a portable cubic display box (23), in the front wall (45) of which a matt screen (27) is located as screen, while at the side edge of a back wall (46) of said display box the projection device (1) focussed on said matt screen is disposed, and the path of the beams passing from the projections objective (7) mounted in front of said projection device across a first deflecting mirror (24) located at an adjacent side wall, across a second deflecting mirror (25) at the wall (48) of said display box opposite said first deflecting mirror, and across a third deflecting mirror (26) disposed obliquely to the center of said display box, to said matt screen, wherein said matt screen (27) occupies the whole front wall (45) of said display box (23) and said third and said second deflecting mirrors (26; 25) are set back as against the matt screen (27) to such an extent that said first deflecting mirror (24) finds its place in the beam-free dead corner (49) of said third deflecting mirror (26) near that deflecting mirror.

19. Apparatus according to claim 18, characterized in that said second deflecting mirror (25) is inclined as against the adjacent wall (48) of said display box in direction toward approaching said first deflecting mirror (24) to said projection device (1).

20. A projector for continuously screening a strip of transparency film having perforated margins, including means for feeding said strip in a closed path defined by said feeding means, wherein said feeding means comprise two endless conveyor belts which are spaced apart so as to support said perforated strip margins and which are each provided with at least one lug releasably engageable in a respective perforated margin with a snap fit, whereby to anchor the two ends of the strip to the belts and form a loop of film.

* * * * *